United States Patent [19]

Santasalo et al.

[11] Patent Number: 4,917,771

[45] Date of Patent: Apr. 17, 1990

[54] DISTILLING APPARATUS

[75] Inventors: Lauri Santasalo, Helsinki; Esko Huhta-Koivisto, Espoo; Jouko Ruokonen, Helsinki, all of Finland

[73] Assignee: Oy Santasalo-Sohlberg Oy, Finland

[21] Appl. No.: 160,314

[22] Filed: Feb. 25, 1988

[30] Foreign Application Priority Data

Feb. 26, 1987 [FI]  Finland .................... 870846

[51] Int. Cl.⁴ .............................................. B01D 1/10
[52] U.S. Cl. .................................... 202/177; 202/174; 202/185.1; 202/197; 202/237; 202/269; 202/270; 159/17.2; 159/27.2; 159/46; 159/DIG. 42; 165/173; 203/10; 203/22; 203/25
[58] Field of Search ............... 202/177, 173, 237, 174, 202/197, 179, 198, 269, 185.1, 270; 203/26, 22, 24, 25, 40, 10, DIG. 17, 99; 159/27.1, 24.1, 27.2, 27.4, 28.3, 23, 17.2, 24.2, DIG. 2, DIG. 42, 46; 165/173

[56] References Cited

U.S. PATENT DOCUMENTS

| | | | |
|---|---|---|---|
| 700,374 | 5/1902 | Roake | 202/197 |
| 2,117,337 | 5/1938 | Lobl et al. | 159/27.1 |
| 2,185,595 | 1/1940 | Kleinschmidt | 159/24.1 |
| 2,398,184 | 4/1946 | Kleinschmidt | 203/26 |
| 2,423,205 | 7/1947 | Rowntree | 202/197 |
| 3,052,452 | 9/1962 | Taga | 165/173 |
| 3,080,302 | 3/1963 | Rogers et al. | 202/197 |
| 3,186,924 | 6/1965 | Williamson | 165/173 |
| 3,227,630 | 1/1966 | Beckman | 159/27.1 |
| 3,317,406 | 5/1967 | Beard | 202/180 |
| 4,691,769 | 9/1987 | Flamm et al. | 165/173 |

FOREIGN PATENT DOCUMENTS 277215 9/1930 Italy ..................... 202/180

Primary Examiner—Wilbur Bascomb
Attorney, Agent, or Firm—Steinberg & Raskin

[57] ABSTRACT

A column construction or boiling space in a distilling apparatus, having a pure vapor input connector, an input connector for water to be distilled, numerous heat exchange tubes within the column construction, a pure vapor removal connector, a condensate removal connector, and a connector for removing water to be distilled that has not vaporized. Pure steam is disposed to flow through heat exchange tubes, while impure water to be distilled is disposed to flow through an intermediate space between the heat exchange tubes. The heat exchange tubes are, at both ends, joined to flanges.

12 Claims, 1 Drawing Sheet

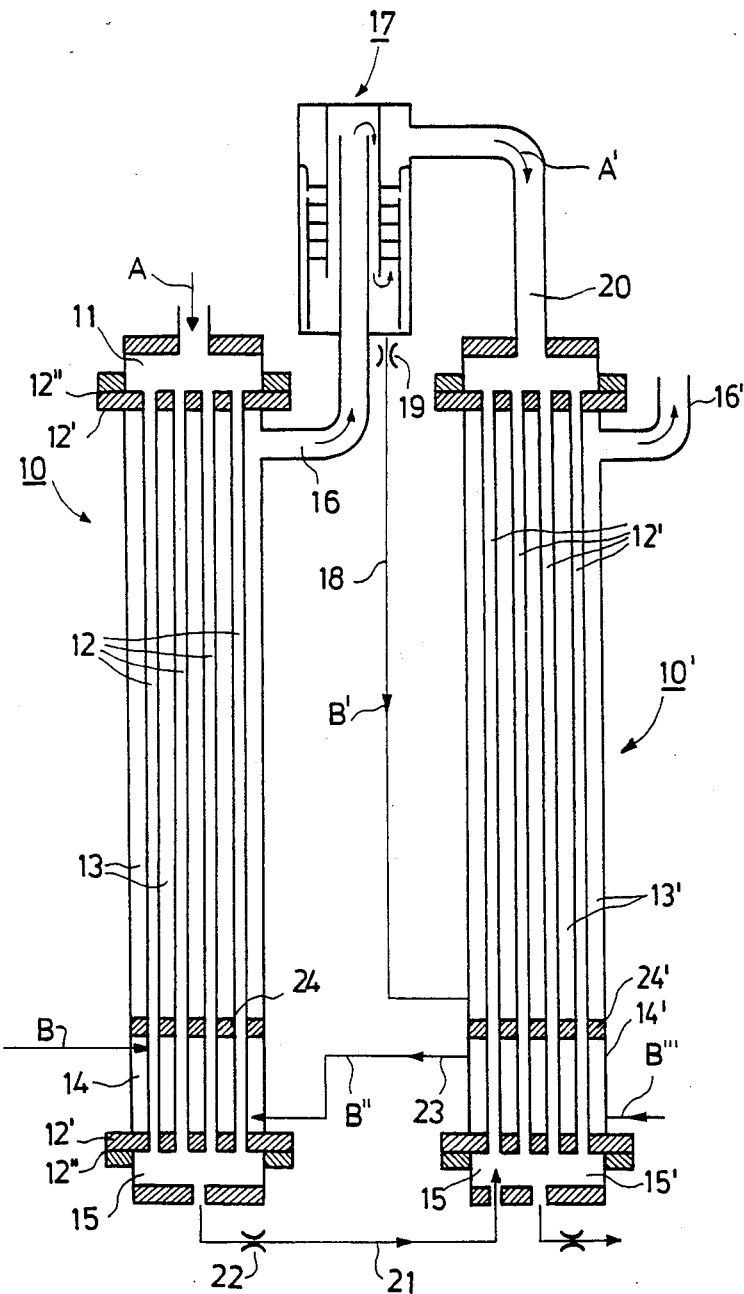

DISTILLING APPARATUS

BACKGROUND OF THE INVENTION

The present invention concerns a column construction or a boiling space in a distilling apparatus, comprising a pure vapor input connector, an input connector for water to be distilled, numerous heat exchange tubes within the column structure, a pure vapor removal connector, a condensate removal connector, and a connector for removal of water to be distilled which has not been vaporized.

Numerous types of distilling apparatus of the kind defined above are known in the art. The problems associated with energy economy have been solved in distilling apparatus now on the market, so that attention is presently directed to the quality of the distilled water.

The quality of the distilled water is influenced by the materials of the structures of the distilling apparatus, the structural details of the distilling apparatus, and, above all, by the mode of welding applied in producing such structures.

In quality considerations of distilled water, particular attention is presently paid to minor impurities, even molecular in order of magnitude, which are still able to enter through microscopic crevices in structures of distilling apparatus designs of the art.

Such microscopic crevices are formed, e.g., when the heat exchange tubes are affixed to the flanges. Particular mention may be made of biogenic bacteria, viruses, endotoxins, etc., which have a molecular weight even on the order of 10,000 to 500,000. Such impurities are extremely harmful, and may totally destroy the quality of the distilled water. It has not been possible to avoid this drawback in designs of the prior art.

In distilling apparatus presently known, the general principle of operation is that in the column of the distilling apparatus, pure vapor is introduced by the input connector, and feed water is conducted into a distribution space where the water enters the heat exchange tubes and runs down within the same. Especially susceptible points regarding formation of microcrevices are the junctures where the heat exchange tubes join the flange structures. In distilling apparatus designs of existing art, elimination of microcrevices has been attempted by applying the so-called expanding technique. Comparatively tight-sealing junctures are obtained by such a problem solution, however this method involves relatively high cost, while complete elimination of microcrevices cannot be achieved even with this method.

SUMMARY OF THE INVENTION

Accordingly, it is an object of the present invention to improve heat exchange between fluid mediums, notably in distilling techniques.

It is also an object of the present invention to prevent contamination of fluid that is distilled, notably in a distilling apparatus.

It is an additional object of the present invention to improve over distilling apparatus column designs presently used in the art.

It is a further object of the present invention to provide a distilling apparatus column structure in which harmful microcrevices are reliably avoided.

These and other objects are attained by the present invention which is directed to distilling apparatus, comprising a structure defining a space therein, a plurality of heat exchange tubes extending through the space, a first input connector for liquid to be distilled communicating with the space, a second input connector for heating vapor communicating with one end of the tubes, a first output connector communicating with the space for a mixture of vapor generated in the structure and remaining liquid which has not vaporized in the structure, and a second output connector communicating with an opposite end of the tubes for removing condensate and any remaining heating vapor. The structure, space, tubes, and connectors are arranged to conduct the heating vapor through the tubes extending through the space, and to conduct the liquid to be distilled through the space itself and around the tubes. The structure itself is preferably in the shape of a column, which is preferably substantially upright, with the tubes extending therethrough substantially vertically. Furthermore, third and fourth output connectors may communicate with the first output connector, especially through means for separating the generated vapor from the remaining liquid, with the third output connector situated to conduct flow of the vapor generated in the structure, and the fourth output connector situated to conduct flow of the remaining liquid which has not vaporized in the structure.

The present invention may also be applied in condensing apparatus having a structure defining a space therein, a plurality of heat exchange tubes extending through the space, a first input connector for cooling liquid communicating with said space, a second input connector for heating/vapor to be condensed communicating with one end of the tubes, a first output connector communicating with the space for the cooling liquid, and a second output connector communicating with an opposite end of the tubes for removing the condensate and any remaining vapor. The structure, space, tubes and connectors are all arranged to conduct the vapor to be condensed through the tubes in which the vapor is at least partially condensed, and to conduct the cooling liquid through the space itself and around the tubes.

Moreover, the present invention is directed to a method for distilling a liquid, which comprises the steps of passing heating fluid including vapor in a series of tubes extending through an interior space in a distilling apparatus, and passing liquid to be distilled into the interior space and around the tubes, whereby the liquid is at least partially vaporized and distillation of the same is carried out without formation of microcrevices at junctures of the tubes. The liquid to be distilled may be pre-heated by passing the same into heat exchange contact with the heating fluid flowing through the tubes after the fluid has flowed through the tubes in the interior space.

Therefore, the aims and objects of the present invention are attained with a distilling apparatus column construction which is principally characterized by the pure vapor having been disposed to flow through the heat exchange tubes, and the impure water to be distilled having been disposed to flow through the intermediate space between the heat exchange tubes.

Accordingly, in the present invention a column construction or boiling space in a distilling apparatus, comprises a pure vapor input connector, an input connector for water to be distilled, numerous heat exchange tubes within the column construction, a pure vapor removal connector, a condensate removal connector, and a connector for removing water to be distilled that has not vaporized. The pure vapor is disposed to flow through the heat exchange tubes, while the impure water to be distilled is disposed to flow through the intermediate space between the heat exchange tubes.

Numerous significant advantages are attained by application of the present invention. In the present invention, the inputs of water to be distilled and of pure vapor are arranged contrary to the traditional way of thinking. Due to this arrangement, harmful microcrevices do not occur in the distilling apparatus column construction of the present invention, while the quality of the distilled water meets even the strictest quality requirements.

BRIEF DESCRIPTION OF THE DRAWING

The present invention will now be described in greater detail, with reference to a design principle presented in the accompanying drawing, to which the present invention is not intended to be exclusively confined. In the drawing, the figure is a schematic elevational view of an advantageous embodiment of a distilling apparatus column construction in accordance with the invention herein.

DESCRIPTION OF THE PREFERRED EMBODIMENT

Referring to the accompanying figure, the distilling apparatus column is denoted by reference numeral 10. This column 10 comprises a distribution chamber 11, the flow of the vapor entering this chamber being indicated by arrow A. Within the column structure 10, a plurality of heat exchange tubes 12 is located, through which the pure steam or vapor is disposed to flow. Between the heat exchange tubes 12, an intermediate space 13 is defined by which the impure feed water, or the water to be distilled, is disposed to flow in a flow indicated by arrow B. Reference numeral 14 indicates a preheating space, the significance of which will become clear below.

As can be seen in the figure, the column construction 10 of the invention provides, at both ends of the heat exchange tubes 12, a hygienic juncture in that the heat exchange tubes 12 have been joined at their ends by welding or pressing to the flanges 12', using an accepted sealing compound 12". When a technique such as this is applied, no microcrevices at all can form.

A collector chamber 15 in which the distillate accumulates, is provided at the bottom of the column construction 10 as illustrated. The mixture of vapor and liquid droplets is disposed to flow through a connector 16 to a droplet separator 17. The droplet separator 17 may be any type of droplet separator, for which reason the detailed design thereof is not shown herein. One droplet separator that can be contemplated for use is, for example, a droplet separator based on the centrifugal principle and which has been disclosed in Finnish Patents Nos. 47083 and 61999. The liquid droplets separated in the droplet separator 17 are conducted by connector 18 in a flow B' to the intermediate space 13' of the next column 10' of the distilling apparatus. The flow restriction in the flow line 18 has been denoted by reference numeral 19.

Pure vapor is conducted from the droplet separator 17 in a flow A' along connector 20 to the heat exchange tubes 12''' of next column 10' of the distilling apparatus wherein similar components are denoted by a prime (') symbol. The vapor generated in space 13' and any remaining liquid flows out through a connector 16'.

The pure condensate is conducted from the collector chamber 15 by connector 21, e.g. to the next column 10', into an equivalent collector chamber 15', or directly to a pure condensate output. The flow restriction provided in the flow line 21 is denoted by reference numeral 22. The condensate collected in chamber 15' is conducted through a connector 21' to a next column.

As can be seen in the embodiment illustrated in the figure, the feed water is directed as a flow B" from a preheater in the column construction 10', along preheater connector 23 to the preheater 14 of column construction 10. Distilling apparatus units employed in practice may comprise numerous column constructions 10, 10', etc., in which case the feed water flows in a flow B''' through numerous preheaters 14' and is heated a certain amount in each individual preheater 14. Thus, the feed water arriving at the column construction 10 is already considerably warmed up, so that less energy is required to vaporize the same in the column construction 10. The preheating space 14 is defined between the lower flange 12, and a false bottom 24, as illustrated. In other words, the second structure 10' defines a space 13' therein having a plurality of heat exchange tubes 12''' extending therethrough and a pre-heater 14' situated in a lower portion thereof, with a connector B''' communicating with the pre-heater 14' of the second structure 10' for introducing the liquid to be distilled into the pre-heater 14' of the second structure 10'. At the same time, the connector 23 communicates with both these pre-heaters 14, 14' for removing the liquid from the second structure 10' pre-heater 14' and introducing the same B" into the pre-heater 14 of the first structure 10. The input connector B of the first structure 10 also communicates with the pre-heater space 14 of the first structure 10, whereby the liquid introduced into the first structure 10 through the first input connector B has been appropriately pre-heated.

The principle of the present invention is applicable in connection with any type of distilling apparatus with evaporators, heat exchangers, and boiling spaces, etc. The technique of the present invention may also be equally applied in a column construction in condensers of distilling apparatus. In this case, the cooling water flows on the outside of the tubes, and distillate/pure vapor flows in the tubes of the heat exchanger.

Only a principle solution of the present invention has been presented in the foregoing, and it is clear to a person skilled in the art that numerous modifications thereof are feasible. Accordingly, the preceding description of the present invention is merely exemplary, and is not intended to limit the scope thereof in any way.

What is claimed is:

1. Distilling apparatus, comprising
   a structure defining a space therein,
   a plurality of heat exchange tubes extending through said space and being joined to said structure at junctures thereof,
   a first input connector for introducing impure liquid to be distilled communicating with said space,
   a second input connector for introducing heating vapor communicating with one end of said tubes,
   a first output connector communicating with said space for removing a mixture of vapor generated in said structure and remaining liquid which has not vaporized in said structure, and a second output connector communicating with an opposite end of said tubes for removing condensate and any remaining heating vapor, said structure, space, tubes, and connectors being arranged to conduct said heating vapor through said tubes extending through said space, and to conduct said impure liquid to be distilled through said space itself and around said tubes, without formation of any microcrevices at said tube junctures, additionally comprising flanges joined to both said ends of said heat exchange tubes at said junctions thereof, a condensate collecting chamber situated underneath said flange joined to a bottom end of said tubes and through which said tubes and said second output connector communicate, and a distribution chamber situated above said flange joined to a top end of said tubes and through which said tubes and said second input connector communicate.

2. The combination of claim 1, wherein said structure is in the shape of a column.

3. The combination of claim 1, additionally comprising third and fourth output connectors communicating with said first output connector, said third output connector situated to conduct flow of the vapor generated in said structure, said fourth output connector situated to conduct flow of the remaining liquid which has not vaporized in said structure, and means for separating the generated vapor from the remaining liquid which communicate said first output connector with said third and fourth output connectors.

4. The combination of claim 3, wherein said separating means is a droplet separator.

5. The combination of claim 1, wherein said tube junctures are welded junctures of said heat exchange tubes with said flanges.

6. The combination of claim 1, wherein said tube junctures are pressed junctures of said heat exchange tubes and flanges, with a sealing compound.

7. The combination of claim 1, wherein said structure is in the shape of a column that is substantially upright, with said tubes extending therethrough substantially vertically, and additionally comprising a false bottom situated in a lower part of said structure, a pre-heater space defined between said false bottom and said flange joined to a bottom end of said heat exchange tubes, said tubes extending through said pre-heater space, and means for passing the liquid to be distilled into and out of said pre-heater space prior to introduction into said structure space through said first input connector.

8. The combination of claim 3, additionally comprising a second structure defining a space therein with a plurality of heat exchange tubes extending therethrough, with said fourth output connector communicating with said space of said second structure, and with said third output connector communicating with said heat exchange tubes of said second structure.

9. The combination of claim 2, wherein said column is substantially upright and said tubes extend therethrough substantially vertically.

10. The combination of claim 9, wherein said first input connector communicates with a lower portion of said space, and said first output connector communicates with an upper portion of said space.

11. The combination of claim 1, wherein said structure comprises a first structure, said first structure additionally comprising a false bottom situated in a lower part of said first structure, and a pre-heater space defined between said false bottom and said flange joined to a bottom end of said heat exchange tubes, a second structure defining a space therewithin with a plurality of heat exchange tubes extending therethrough substantially vertically and a pre-heater space situated in a lower portion thereof, a connector communicating with said pre-heater space of said second structure for introducing the liquid to be distilled into said pre-heater space of said second structure, and a pre-heater connector communicating with both said pre-heater spaces for removing the liquid from said second structure pre-heater space and introducing the same into said pre-heater space of said first structure, and said first input connector communicating with said pre-heater space of said first structure, whereby the liquid introduced into said first structure through said input connector has been pre-heated.

12. The combination of claim 1, additionally comprising a condensate collecting chamber situated underneath said flange joined to a bottom end of said tubes and through which said tubes and said second output connector communicate.

* * * * *